United States Patent Office 2,842,525
Patented July 8, 1958

2,842,525

MODIFIED VINYLIDENE CYANIDE INTERPOLYMERS AND THE DYEING OF FIBERS THEREOF

George Gateff, Lakewood, and James A. Klupar, Avon Lake, Ohio, assignors to The B. F. Goodrich Company, New York, N. Y., a corporation of New York No Drawing. Application April 27, 1956
Serial No. 581,003

5 Claims. (Cl. 260—78.3)

This invention relates to the preparation of vinylidene cyanide interpolymers containing dye-receptive groups and to the dyeing of fibers and films made of such interpolymers with acid, basic and direct dyes. More particularly the invention pertains to the preparation of vinylidene cyanide interpolymers containing beta-propiolactone rings followed by the opening up of such rings to produce dye-receptive groups, and to the dyeing of fibers and films made from such modified vinylidene cyanide interpolymers.

In U. S. Patents 2,476,270, 2,502,412 and 2,514,387 novel methods for the preparation of monomeric vinylidene cyanide are disclosed. In U. S. Patent 2,589,294, methods for the preparation of useful homopolymers of vinylidene cyanide and the formation of films and filaments therefrom are disclosed.

Monomeric vinylidene cyanide is a clear liquid at room temperature and a crystalline solid at 0° C. It melts in the range of 6.0° C. to 9.7° C. depending upon purity, the pure samples melting at 9.0° C. to 9.7° C., and it boils at 40° C. at a reduced pressure of 5 mm. mercury. Monomeric vinylidene cyanide is quite unstable because of its extreme sensitivity to water, undergoing on contact with water at room temperature an instantaneous homopolymerization reaction to give a solid, water-insoluble resin. When monomeric vinylidene cyanide is allowed to stand at room temperature in admixture with butadiene-1,3, it reacts therewith to give solid 4,4-dicyano cyclohexene.

Vinylidene cyanide fiber-forming interpolymers are described in U. S. Patents Nos. 2,615,865 through 2,615,880, 2,628,954, 2,650,911, 2,654,724, 2,654,728, 2,657,797, 2,716,104 through 2,716,106 and in copending applications Serial Nos. 402,823 filed January 7, 1954, now U. S. Patent No. 2,786,046, 407,595 filed February 1, 1954, and now abandoned, and 526,335 filed August 3, 1955. As described therein, synthetic fibers spun from such interpolymers possess unusually high strength and other desirable properties.

To be of value to the trade, however, any synthetic fiber produced must be readily and successfully dyeable, preferably with the dyes and techniques currently in use. Like many hydrophobic synthetic fibers and filaments, those made from vinylidene cyanide polymers and interpolymers have slick, smooth surfaces and are resistant to penetration by ordinary dyestuffs. Further, these polymeric fibers offer a minimum of points or molecular groups to which dye molecules may become affixed. Heretofore, attempts to dye vinylidene cyanide interpolymer fibers using techniques and materials known for fibers such as wool, cotton and silk have produced only weakly colored fibers lacking in attractiveness and more heavily colored fibers lacking in resistance to laundering. This resistance to dyeing presents a serious obstacle to commercial development of these synthetic fibers in textile applications whose products are ordinarily in sight when they are in use such as wearing apparel, curtains, blankets, rugs and furniture coverings.

An object of this invention is to provide fibers, filaments, yarns and fabrics of vinylidene cyanide polymers and interpolymers which are readily dyeable with acid, basic and direct dyes. Another object is to provide copolymers and interpolymers of vinylidene cyanide which contain pendant side groups on the polymer chains that react after chemical modification with the reactive groups in acid, basic and direct dyes. A further object is to provide textiles made of vinylidene cyanide polymers and interpolymers that are dyeable with standard, commercially available dyes; and possess, when so dyed light, cleaning and laundering fastness comparable to dyed woolen fibers and fabrics.

These and other objects are attained in accordance with this invention and the dyeability of vinylidene cyanide based polymers and interpolymers is improved by attaching side groups, which will be reactive with various dyes, to the polymer chains. This is accomplished by copolymerizing with vinylidene cyanide alone or with vinylidene cyanide and other olefinic monomers copolymerizable therewith a small amount of beta-methylene-beta-propiolactone, a monomer which enters the polymer chain in such a manner that a small number of beta-propiolactone rings are left pendant from the polymer chain. These rings are then modified by chemical means into groups that will readily accept dyes. The amount of beta-methylene-beta-propiolactone entering the interpolymers is atcually so small that physical properties of the new interpolymers show no change when compared with those of interpolymers similarly prepared with no beta-methylene-beta-propiolactone, but dyeability of films and fibers made from the new materials is vastly better than that of vinylidene cyanide interpolymer films and fibers presently known in the art.

Beta-methylene-beta-propiolactone monomer copolymerizes with monomeric vinylidene cyanide and with mixtures of monomeric vinylidene cyanide plus one or more other monomeric olefins which are copolymerizable therewith. Many of these comonomers are disclosed in the patents and patent applications enumerated in the fourth paragraph hereof, the disclosures of which are incorporated herein by reference. Only a minor amount of beta-methylene-beta-propiolactone enters the copolymer or interpolymer chain, but the few beta-propiolactone rings that do become attached to the polymer chain provide enough dye-receptive sites, when treated with an active hydrogen compound, to vastly improve the dyeability of polymer fiber or film compared to that of similar materials made without the beta-methylene-beta-propiolactone.

It has been found that when monomeric vinylidene cyanide is copolymerized with beta-methylene-beta-propiolactone, in the presence of a free radical catalyst, under proper conditions of temperature and pressure new and highly useful copolymers containing 3 percent or less by weight of beta-methylene-beta-propiolactone are obtained. One or more other polymerizable olefins may also be present in the polymerization reaction.

The polymer molecules formed contain a hydrocarbon chain with nitrile and beta-propiolactone side groups (A). If a third monomer such as vinyl acetate is present in the polymerization, the chain will have acetyl side groups as well (B). The ring carbon of the propiolactone ring is part of the copolymer chain:

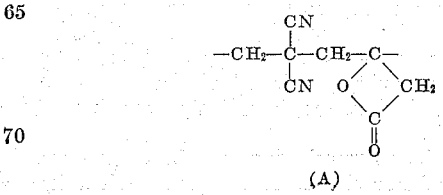

(A)

or

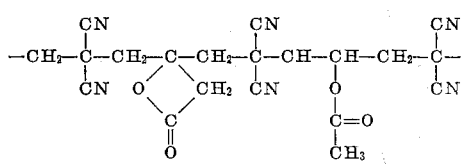

(B)

When the lactone rings are subjected to attack by a compound containing an active-hydrogen group, the rings cleave on one side or the other, and sometimes on a mixture of both sides, of the alkyl oxygen as described in "Beta-Propiolactone.XI. Reactions with Ammonia and Amines," Journal of the American Chemical Society 73, 3168 (1951). This results in the formation on the polymer side chains of hydroxyl, carboxyl, amino and amido groups which can later be centers of reaction with various types of dye stuffs.

Numerous active hydrogen-containing compounds which may be used to cleave the lactone ring are known to the art and include: ammonia, aliphatic and aromatic amines, such as methylamine, ethylamine, propylamine, decylamine, dimethylamine, diethylamine, dipropylamine, N,N-dimethyltrimethylenediamine, methyl ethylamine, zenzylamine, aniline and naphthylamine. Phenol, cresol, cumenol, naphthol, hydrogen sulfide, ethanethiol, butanethiol, thiophenol, methanol, ethanol, butanol, cyclohexanol, aminoethanol, hydrogen chloride, sulfuric acid, phosphoric acid, phosphinic acid and acetylene besides such materials as malonic acid and its esters and acetoacetic ester will also cleave the lactone ring.

Beta-methylene-beta-propiolactone, which is polymerized with vinylidene cyanide and other olefinic monomers polymerizable therewith in accordance with the present invention is prepared as described on pages 127 to 135, vol. 111, "Organic Reactions," John Wiley and Sons, Inc. (1946), and possesses the structure

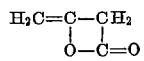

Only a small amount of beta-methylene-beta-propiolactone actually enters the copolymer chain, but amounts as low as 0.5 percent to 3 percent of beta-methylene-beta-propiolactone based on the product polymer provide enough pendant side chain groups to react adequately with dyestuffs.

The polymerization itself may be carried out in several different ways. One preferred method consists in first dissolving the vinylidene cyanide and the beta-methylene-beta-propiolactone in benzene or other liquid aromatic solvent such as toluene, xylene, chlorobenzene, nitrobenzene or the like, preferably in an amount such that the solvent comprises approximately 30 to 80% by weight of the total solution. This solution is then maintained at a temperature of about —15° C. to 100° C. in the presence of a free radical catalyst whereupon polymerization occurs to form the desired copolymer as a white polymer of small particle size. The copolymer thus formed may be separated from the polymerization medium simply by filtering, or, if desired, the polymerization medium may be removed by an evaporation process.

A second method of polymerization consists in agitating the monomers in one of the liquid aliphatic hydrocarbons (which are nonsolvents for vinylidene cyanide), for example, hexane or heptane, and heating in the presence of a polymerization catalyst whereupon the copolymer forms and may be separated from the polymerization medium by filtering or by evaporation of the solvent. It is important when utilizing either of these methods that the liquid organic diluent be free from impurities which initiate the ionic polymerization of vinylidene cyanide.

Alternatively, the polymerization may be carried out without the use of a solvent or other liquid medium for the monomers, that is simply by heating and agitating a mixture of the monomers in the presence of a polymerization catalyst. The polymerization may be effected at temperatures as low as —15° C. or lower, or as high as 100° C. or even higher.

The catalysts which are suitable for use in the polymerization include the peroxygen compounds such as silver peroxide, the perborates, the percarbonates, benzoyl peroxide, caproyl peroxide, lauroyl peroxide, acetone peroxide, acetyl benzoyl peroxide, cumene hydroperoxide; o,o'-dibromo benzoyl peroxide; o,o'-dichloro benzoyl peroxide, caprylyl peroxide, pelargonyl peroxide, tertiary butyl hydroperoxide, tetralin peroxide and the like.

Another class of catalysts useful in preparing interpolymers according to this invention comprises compounds of the structure

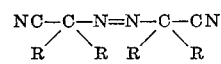

wherein each R is a hydrocarbon radical. Examples of compounds of this class include alpha,alpha'-azodiisobutyronitrile, alpha,alpha'-azobis(alpha,beta-dimethylbutyronitrile), alpha,alpha'-azobis(alpha-cyclo-propionitrile) and the like. Diazo compounds other than those which possess the above structure are not useful in the practice of this invention as they initiate the ionic homopolymerization of the vinylidene cyanide monomer to the extent that none of the desired interpolymer is obtained.

Once prepared by any of the described methods, the polymers and interpolymers of this invention are easily formed into shaped articles such as rods, fibers and films. Certain solvents including dimethylformamide, dimethyl sulfoxide, nitromethane, acetonitrile, and tetramethyl urea dissolve small amounts of these polymers merely by agitating the polymer in the solvent with or without the addition of heat. Larger quantities of polymer solutions are readily prepared by first cooling the solvent to a temperature at which its solvent power is considerably lowered, adding the polymer while vigorously agitating the liquid so that the polymer particles are dispersed in the cooled solvent and then heating the dispersion to dissolve the dispersed particles. This technique avoids lumping or agglomeration of the polymer. Solutions containing from 5 to 40 percent of polymer by weight are preferred for spinning into fibers or casting into films.

Fibers are easily formed by spinning the solution through a multihole spinneret into air or into a bath of non-polymer solvent. Films can be formed by pouring a layer of polymer solution onto a hot plate at about 100° C. The solvent soon evaporates leaving clear polymer film. Both fibers and films can be dyed with known classes of dyes such as acid, base and direct dyes by placing the polymer articles in dye baths under various conditions of heat, pressure, and agitation. In general, a polymer containing vinylidene cyanide as one of its monomeric components dyes weakly and not very satisfactorily. The presence in the polymers of this invention however, of a few propiolactone rings that have been attacked and cleaved by an active-hydrogen containing compound serves to produce dyed articles of pleasing fastness and brilliance as is shown in the following examples which illustrate the preparation of copolymers of vinylidene cyanide with beta-methylene-beta-propiolactone in accordance with this invention, but are not to be construed as a limitation upon the scope thereof, for there are, of course, numerous possible variations and modifications. In the examples all parts are by weight unless otherwise indicated.

*Example I*

A supply of powdered vinylidene cyanide monomer was prepared according to the teachings of U. S. Patent 2,476,270. Twenty-two and one-half grams of vinylidene cyanide and 24.2 grams of beta-methylene-beta-propiolactone (mol ratio 1 to 1) were dissolved in 80 grams of benzene and warmed to 75° C. when 0.1 gram of alpha,alpha'-azodiisobutyronitrile were added. Polymerization was continued for three hours. The product copolymer was a cream-colored powder with a softening point of 140° C.

Two five gram portions of the product were separately dissolved in 45 grams of acetonitrile to form clear dope solutions. 0.5 gram of hexamethylene diamine was reacted with one solution while the second was maintained as a control. Both solutions produced clear films when cast upon a polished hot plate. After immersion for 1 hour at 205° F. in a dye bath with a 40 to 1 bath to goods ratio and 3 percent on weight of goods of Durazol Red 2B, a direct dye, the samples were rinsed and dried. The amine treated copolymer sample was satisfactorily dyed to a red color, while the untreated copolymer sample was only very lightly colored.

Example II

Twenty-six grams of vinylidene cyanide, 195 grams of vinyl acetate and 5.6 grams of beta-methylene-beta-propiolactone (mol ratio 1:6.8:0.2) were dissolved in 234 grams of monochlorobenzene. The solution was warmed to 50° C. and 0.53 gram of o,o'-dichlorobenzoyl peroxide was added. Polymerization was continued for three hours. The terpolymer product was filtered, dried and showed an intrinsic viscosity of 2.57 and a softening point of 160–163° C.

Two 5 gram portions of terpolymer were separately dissolved in 45 grams of nitromethane. One solution was treated with 0.5 gram of phosphoric acid and the second was maintained as an untreated control. Films were cast from both solutions and placed in 40 to 1 dye baths containing 5% Sevron Brilliant Red 4G, a basic dye, for one hour at 205° F. After a cold water rinse the treated terpolymer film showed successful dyeing, while the untreated film was very weakly colored.

Example III

Twenty-six grams of vinylidene cyanide, 195 grams of vinyl acetate, and 5.6 grams of beta-methylene-beta-propiolactone (mol ratio 1:6.8:0.2) were dissolved in 234 grams of benzene. The solution was warmed to 50 C. and 0.1 gram of alpha,alpha'-azodiisobutyronitrile was added. Polmerization was continued for four and a quarter hours. The terpolymer product was filtered, dried and had the properties of solubility in dimethyl formamide, intrinsic viscosity 2.64 and softening point of 135–138° C.

Two five gram portions of the terpolymer were separately dissolved in 45 grams of acetonitrile. One solution was treated with 0.5 gram of methyl amine and the second was kept untreated as a control. Filaments formed by extruding the solution through spinnerets were placed in 40 to 1 dye baths containing 5% Durazol Red 2B, a direct dye, for one hour at 205° F. The treated terpolymer sample satisfactorily absorbed the dye, while the untreated control did not.

Example IV

Twenty-two and one-half grams of vinylidene cyanide, 400 grams of vinyl acetate and 5.4 grams of beta-methylene-beta-propiolactone (mol ratio 1:16:0.2) were dissolved in 500 grams of benzene and warmed to 50° C. 0.25 grams of alpha,alpha'-azodiisobutyronitrile were added and polymerization was continued for three hours. The terpolymer product was filtered and dried and exhibited the following properties: soluble in dimethyl formamide, intrinsic viscosity 4.2, caustic stability good, softening point 156–158° C.

Four 5 gram portions of the terpolymer product were separately dissolved in 45 grams of acetonitrile. Thick, pink-colored dopes were thus produced. When these dopes were each reacted with a different active-hydrogen bearing compound, namely:

0.5 gr. 2(2-aminoethylamino) ethanol
0.5 gr. monoethanolamine
0.5 gr. tetraethylenepentamine
0.5 gr. ethylene imine the dope solutions became a clear, light yellow and the solution viscosity visibly decreased in every case.

The 2(2-aminoethylamino) ethanol treated portion was cast onto a hot plate and a clear film was formed. A corresponding film was formed from vinylidene cyanide-vinyl acetate copolymer dissolved in acetonitrile and treated with 10 percent on the polymer of 2(2-aminoethylamino) ethanol. When these films were placed in dye baths at liquor to film ratios of 40 to 1 containing 5 percent concentration of Fast Light Red 4 BA acid dye and boiled for one hour, the treated terpolymer film dyed a deep red whereas the treated copolymer film took no dye at all.

Example V

Ten grams of the terpolymer produced in Example 4 were dissolved in 90 grams of acetonitrile and treated with 5 percent on weight of polymer of 2(2-aminoethylamino) ethanol. Half of this solution was cast into a film which was dyeable with acid dye as in Example 4 and half was extruded through a spinneret to form fibrous filaments which also readily accepted the red acid dye while vinylidene cyanide-vinyl acetate copolymer filaments proved to be undyeable under the same conditions.

Example VI

Eighty-three grams of vinylidene cyanide, 622 grams of vinyl acetate and 18 grams of beta-methylene-beta-propiolactone (mol ratio 1:6.8:0.2) were dissolved in 560 grams of benzene, heated to 50° C. and 0.78 gram of alpha,alpha'-azodiisobutyronitrile were added. 181 grams of dry terpolymer were obtained after 4 hours of polymerization. The terpolymer was soluble in dimethyl formamide and acetonitrile, had an intrinsic viscosity of 2.5 and a softening point of 140–142° C.

Five gram portions of the terpolymer produced were dissolved in 45 gram portions of acetonitrile. Hexamethylenediamine and ethanolamine were added to individual terpolymer solutions in 0.5 gram amounts. The solution was spun through a spinneret to form strong, light colored fibers which were dyed in acid dye baths as in Example 4. Both treated terpolymer films accepted the dye while control films of vinylidene cyanide-vinyl acetate copolymer cast from similarly treated acetonitrile solutions emerged essentially colorless from the boiling dye baths.

Example VII

Thirteen and eight-tenths grams of vinylidene cyanide, 100 grams of vinyl acetate and 7.4 grams of beta-methylene-beta-propiolactone (mol ratio 1:6.5:0.5) were dissolved in 250 grams of benzene. The solution was warmed to 50° C. and 0.13 gram of alpha,alpha'-azodiisobutyronitrile was added. Polymerization continued for 5 hours and 20 grams of dry terpolymer were produced. The terpolymer was soluble in dimethyl formamide and acetonitrile, and had an intrinsic viscosity of 1.73 and a softening point of 143–144° C.

Eight grams of terpolymer were dissolved in 80 grams of acetonitrile. 0.4 gram of 2(2-aminoethylamino) ethanol was added to open the lactone rings and a film was cast on a hot plate. The film dyed readily in a Fast Light Red 4 BA acid dye bath.

Although specific examples of the invention have been described herein, it is not intended to limit the invention solely thereto, but to include all the variations and modifications falling within the spirit and scope of the appended claims.

We claim:

1. The process of preparing a vinylidene cyanide interpolymer comprising 45 to 55 mol percent vinylidene cyanide responsive to dyeing with acid, basic and direct dyes which comprises polymerizing a monomer mixture containing monomeric vinylidene cyanide and beta-methylene-beta-propiolactone thereby to form an interpolymer containing beta-propiolactone rings attached to the polymer chain and then treating the interpolymer with a compound containing active hydrogen selected from the group consisting of amines, imines, inorganic acids and alcohols to open the beta-propiolactone rings and produce dye-receptive groups in the interpolymer structure.

2. The process of claim 1 wherein the monomer mixture polymerized is made up of vinylidene cyanide, vinyl acetate, and beta-methylene-beta-propiolactone.

3. The process of claim 1 wherein the compound containing reactive hydrogen is ammonia.

4. A dyed product comprising a 45 to 55 mol percent vinylidene cyanide, beta-methylene-beta-propiolactone copolymer which after treatment with an active hydrogen containing compound selected from the group consisting of amines, imines, inorganic acids and alcohols is dyed by a dye selected from the group consisting of acid, basic and direct dyes.

5. A composition of matter comprising a polymer of 45 to 55 mol percent vinylidene cyanide, vinyl acetate, beta-methylene-beta-propiolactone which has been treated with an active hydrogen containing compound selected from the group consisting of amines, imines, inorganic acids and alcohols to cleave the propiolactone ring side groups and then dyed with a dye selected from the group consisting of acid, basic and direct dyes.

References Cited in the file of this patent

UNITED STATES PATENTS

| | | |
|---|---|---|
| 2,347,508 | Rugeley et al. | Apr. 25, 1944 |
| 2,402,846 | Ryan | June 25, 1946 |
| 2,585,537 | Coffman | Feb. 12, 1952 |
| 2,615,866 | Gilbert et al. | Oct. 28, 1952 |